Figure 1:
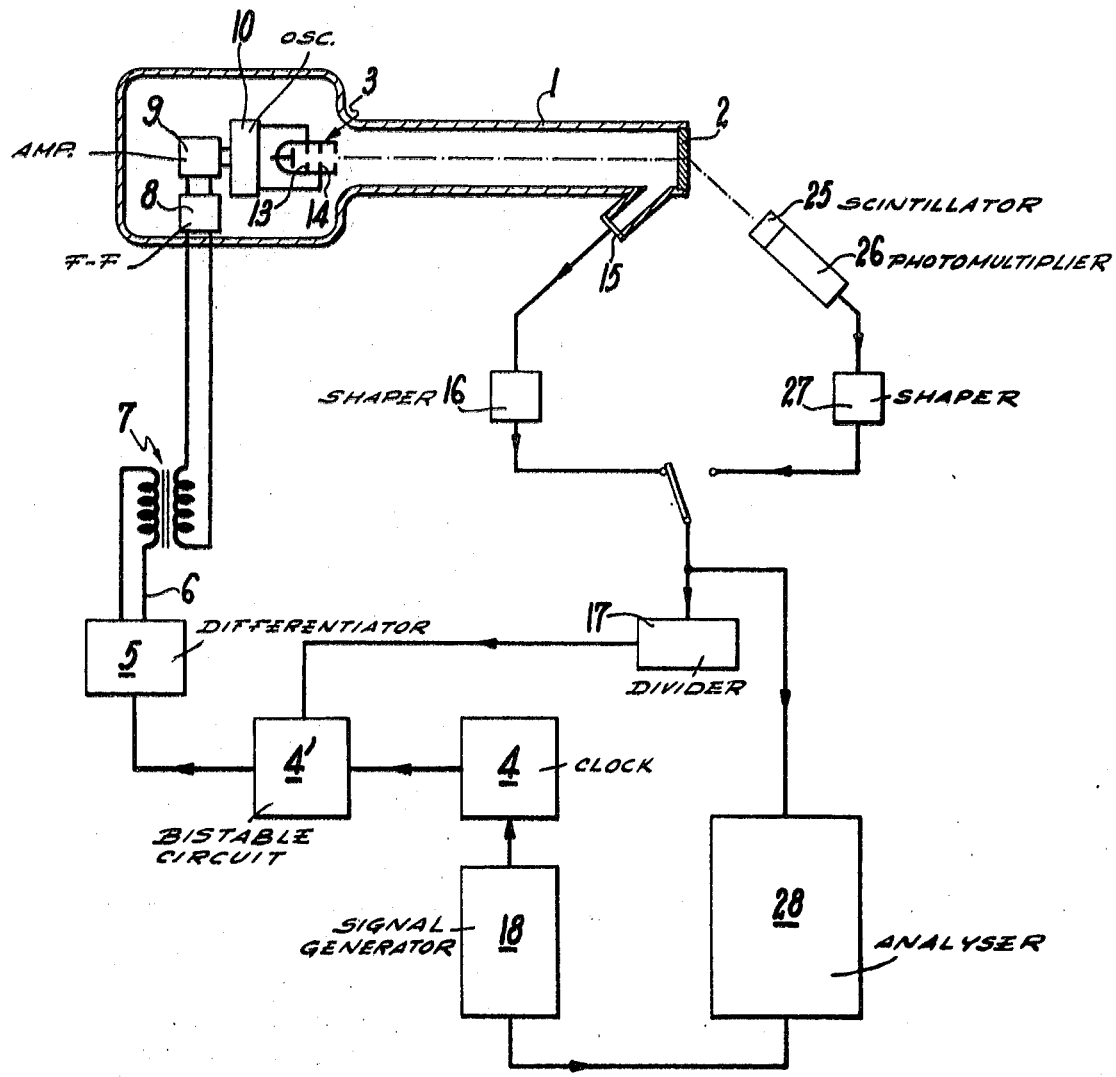

United States Patent
Pierson

[15] 3,657,539
[45] Apr. 18, 1972

[54] METHOD AND DEVICE FOR MODULATING OR STABILIZING A NEUTRON FLUX OBTAINED FROM AN ION ACCELERATOR

[72] Inventor: Alexandre Pierson, Biviers, France
[73] Assignee: Commissariat A L'Energie Atomique, Paris, France
[22] Filed: June 16, 1969
[21] Appl. No.: 833,346

[30] Foreign Application Priority Data
June 28, 1969 France..................................157055

[52] U.S. Cl.............................................250/83.1, 250/84.5
[51] Int. Cl.........................................................G01t 3/00
[58] Field of Search..........................................250/83.1, 84.5

[56] References Cited
UNITED STATES PATENTS
2,867,728  1/1959  Pollock...........................250/83.1 X
3,034,008  5/1962  Soloway..........................250/83.1 X
3,176,136  3/1965  Hopkinson...........................250/84.5

Primary Examiner—Archie R. Borchelt
Attorney—Craig, Antonelli and Hill

[57] ABSTRACT

A method and device for modulating or stabilizing a neutron flux obtained by bombarding a suitably charged target with nuclear particles which are produced in a pulsed form. The pulsation frequency of the particle source is modulated or stabilized and the duration of the pulsations of said source is controlled in dependence on the measurement of the neutron production rate of the target.

9 Claims, 2 Drawing Figures

FIG. I

METHOD AND DEVICE FOR MODULATING OR STABILIZING A NEUTRON FLUX OBTAINED FROM AN ION ACCELERATOR

This invention relates to a method of modulation or stabilization of a neutron flux obtained from an ion accelerator and also to a practical device for carrying out said method.

One of the methods commonly employed for the production of neutrons consists in bombarding a target of metal alloyed with tritium (titanium or zirconium) by means of a deuteron beam produced by a particle accelerator : neutrons are produced in accordance with the T $(d,n)$ $\alpha$ reaction. It is frequently found necessary in studies relating to reactor physics, in nuclear chemistry research or in applications relating to chemical activation analysis to endeavour to modulate the neutron flux thus obtained according to a number of different laws and especially sinusoidal laws or to stabilize the value of said flux over periods of time which can amount to several hours.

A common method consists in directly modulating or stabilizing the intensity of the ion beam of the accelerator by controlling the beam extraction voltage according to the desired law.

A second method consists in producing an electrostatic deflection of the beam, the voltage applied to the deflection plates being directly modulated or stabilized; the ion beam of constant intensity thus bombards an area of the target which is either variable or constant in time.

However, the effectiveness of these methods is insufficient, especially by reason of wear of the target, of lack of homogeneity as well as variations in neutron yield of the target as a function of the composition of the deuteron beam. In fact, the modulation or stabilization of the neutron flux follows the imposed modulation or stabilization with a degree of precision which does not exceed 15 percent.

In order to improve this precision, it has been proposed while retaining the principle of electrostatic beam deflection to control the modulation or the stabilization of the voltage applied to the deflecting plates according to the output voltage of a neutron detection unit. Although this particular method does make it possible to attain a precision of 1 percent in respect of frequencies below 100 c/s, substantial errors are introduced above this value as a result of distortions and fluctuations in counting. Moreover, it is necessary to place a cooled diaphragm and deflector plates between the output of the accelerator and the target but this is a cumbersome arrangement which gives rise to practical difficulties. Moreover, the diaphragm produces stray neutrons and the wear on the target is both irregular and incomplete. Finally, since the position of the beam on the target is variable, the geometry of the neutron source is not well defined.

The primary object of the present invention is on the one hand, by making use of a pulsed ion source whose ignition frequency is modulated or maintained constant, to permit the use of an electronic control device of the digital type which is much more accurate than the device of the "analog type" employed in deflection systems and, on the other hand, to ensure perfect definition of the geometry of the neutron source during the course of the experiment.

More precisely, the present invention is directed to a method of modulation or stabilization of a neutron flux obtained by bombardment of a suitably charged target by means of nuclear particles, wherein said particles are produced in a pulsed form, said method being characterized in that the pulsation frequency of said source is modulated or stabilized and that the duration of pulsations of the source is made dependent on the measurement of the neutron output of said target.

This invention is also directed to a practical device for carrying out said method, said device being characterized in that it comprises :

a pulsed source of nuclear particles, a neutron-generating target which receives said particles, a detection unit placed in proximity to said target for the measurement of its neutron output, a generator for producing either modulated or continuous voltage, an electronic clock for delivering pulses at variable frequency and controlled by said generator, and an electronic circuit for controlling said source and receiving trigger pulses from said electronic clock and blocking pulses from said detection unit.

Figure 2:
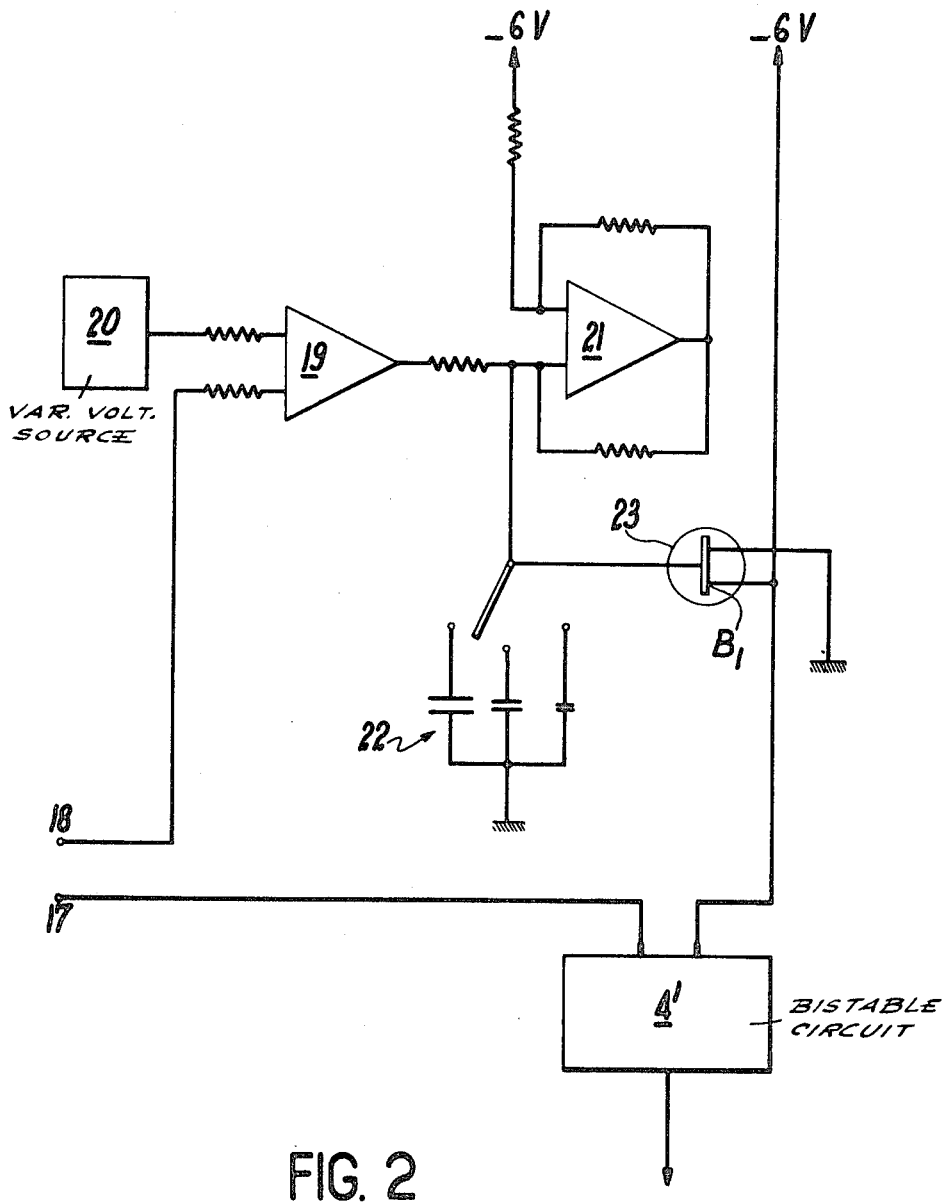

Further properties and advantages of the present invention will become apparent from the following description in which one form of construction of the device under consideration is given by way of explanation but without any limitation, reference being made to the accompanying drawings, in which :

FIG. 1 is a general block diagram of the device in accordance with the invention, and FIG. 2 is a diagram of the electronic circuit for controlling the frequency and duration of bursts of particles with which the target is bombarded, From FIG. 1, it is seen that a particle accelerator which is shown diagrammatically at 1 bombards with deuterons, for example, a target 2 which is formed of metal alloyed with tritium ; the deuterons produced neutrons at said target according to the Y $(d,n)$ $\alpha$ reaction. It is sought to modulate this neutron flux according to a given law or to maintain said flux at a constant value.

In accordance with the invention, the deuterons are produced in bursts by means of an ion source 3 equipped with a pulsation assembly which is identical, for example, with the unit described in French Patent No. 1,401,882 filed on July 22nd, 1964 in respect of "Remote-control device for high-frequency pulsed ion source."

A clock 4 emits pulses having a variable repetition frequency. A control circuit 4' is triggered by the clock 4 and produces square waves having a recurrence frequency which is defined by the value of the modulation or stabilization voltage ; the duration of said square waves is dependent on the value of the number of neutrons derived from the target 2. A detail description of this modulated clock will be given hereinafter.

The output of the control circuit 4' is connected to an impedance-lowering differentiating circuit 5 and the signal obtained is transmitted by a coaxial cable 6 to the primary winding of a pulse transformer 7, the secondary winding of which is at the potential of the high-voltage head. In order to reconstitute the control square-wave signal which is differentiated by this assembly, the secondary winding delivers the pulses into a flip-flop 8 followed by an amplifier 9, both elements being placed within the high-voltage head. The output of the amplifier 9 serves to block or release the high-frequency oscillator 10.

Thus, within the time intervals in which said oscillator is released, an intense ionization takes place within the tube by reason of the high-frequency electric field between the two rings 13 and 14 ; the deuteron delivery of the source is then at a maximum level and the emission of a neutron burst having the same duration as the deuteron pulse then takes place. On the contrary, within the time intervals in which the oscillator is blocked, no field is present within the tube and ionization is zero ; there is therefore no further output from the source and no production of neutrons.

Opposite to the target 2, a semi-conductor junction 15 having an axis which is inclined substantially at an angle of 138° to the beam of incident deuterons serves to count the $\alpha$ particles of 3 MeV energy which are emitted at the time of the T $(d,n)$ $\alpha$ reaction. The signals derived from this junction are amplified, discriminated and shaped in a unit 16, then divided by a factor N by means of a decade divider 17 before driving the control circuit 4' at the same time as the clock pulses 4, the frequency of which is modulated or predetermined by a generator 18.

Said clock is illustrated in detail in FIG. 2. A differential amplifier 19 constituting an impedance-lowereing device has two inputs connected in one case to the generator 18 and in the other case to a variable direct-current voltage source 20 which serves to regulate the mean level. The output of said amplifier controls a current generator which is also constituted by a negative-feedback differential amplifier 21 and this latter charges a capacitor 22, a unijunction transistor 23 being connected to the terminals of said capacitor. When the voltage developed across the terminals of said capacitor attains the turn-on level of the transistor 23, said transistor causes the capacitor to discharge and results in the emission of a clock pulse, whereupon the cycle starts again. Recurrent electric signals are thus obtained and the repetition frequency of these latter is a function of the voltage supplied by the generator 18 and the value of the capacitor 22. In order to make provision for a number of frequency ranges, the capacitor 22 is advantageously made up of a plurality of capacitors which are associated in parallel and can be switched over.

Said clock pulse which is collected at the base B1 of the unijunction transistor 23 is transmitted to the control circuit 4' constituted by a bistable device formed by two transistors and causes said device to change over from state 0 to state 1, thus providing the beginning of the square-wave signal which releases the high-frequency oscillator 10, thereby causing the ignition of the ion source 3. The pulses derived from the detection unit are also transmitted to said bistable device via a decade divider 17 and thus reset said device to state 0, thereby blocking the oscillator 10 and extinguishing the ion source. The following clock pulse again turns on the source and the same process begins again.

Thus, the generator 18 serves either to modulate the frequency of the source-ignition signals according to a given law and especially a sinusoidal law or to maintain said frequency at a constant value, and the duration of each of said square-wave signals is regulated in dependence on the measurement of the neutron production rate of the target 2. Any variation in said production rate other than that which is imposed by the generator 18 is thus immediately compensated either by an increase or by a reduction in the duration of neutron bursts. However, a circuit which is not shown in FIG. 2 makes it possible to prevent the duration of said square-wave signals from being smaller than the time necessary to ensure total ionization of the ion source, namely approximately 7 $\mu s$. A device of this type serves to ensure sinusoidal modulation or stabilization of a neutron flux with a degree of accuracy of the order of a few percent.

An anthracene scintillator 25 placed in proximity to the target 2 and associated with a photomultiplier 26 followed by a shaping threshold unit 27 can also be employed for measuring the neutron production rate by detection of the recoil protons which are produced in said scintillator.

A multichannel analyzer 28 which is employed as a multiscaler and connected to the output of the detection unit makes it possible by storing within the successive channels of a memory device pulses which appear during given time intervals to control the neutron production rate of the target on the screen of its oscilloscope. Said analyzer is connected to the generator 18 and receives from this latter a synchronization signal which initiates the analysis.

It will readily be understood that the present invention is not limited solely to the mode of execution which has been illustrated and described by way of explanation and that the scope of this patent also extends to alternative forms of either all or part of the arrangements described which remain within the definition of equivalent means as well as to any applications of such arrangements.

What we claim is:
1. A method of modulation or stabilization of a neutron flux obtained by bombardment of suitably charged target with nuclear particles comprising producing a beam of said particles in a pulsed form, modulating the pulsation frequency of said beam, measuring the neutron production rate of said target and controlling the duration of the pulsations of the source in dependence on the measurement of the neutron production rate of said target.

2. A particle device for modulating or stabilizing a neutron flux obtained by bombardment of a suitably charged target with neutron particles wherein said device comprises:
   a pulsed source of nuclear particles,
   a neutron-generating target which receives said particles,
   a detection unit placed in proximity to said target for the measurement of its neutron production rate,
   a generator for producing a control voltage,
   an electronic clock controlled by said generator for delivering pulses at a variable frequency in accordance with said control voltage,
   and an electronic control circuit connected to said source and receiving trigger pulses from said electronic clock and blocking pulses from said detection unit for controlling the pulse frequency and the pulse duration of said source.

3. A device in accordance with claim 2, wherein said pulsed source is constituted by a gas-filled chamber in which the ionization of said gas liberates said particles and which is fitted with electrodes for producing a high-frequency electric field for the ionization of said gas and further constituted by a high-frequency oscillator which is connected to said electrodes and which the release periods corresponding to the emission of particle bursts are controlled by the pulses delivered by said electronic control circuit.

4. A device in accordance with claim 2, wherein the detection unit comprises a semi-conductor junction placed in front of the target and protected from the beam of incident particles and a shaping unit associated with said junction for counting $\alpha$ particles which are emitted at the time of the neutron production reaction.

5. A device in accordance with claim 2, wherein the detection unit comprises an anthracene scintillator placed in proximity to the target, a photomultiplier associated with said scintillator and a unit for shaping the signals delivered by said photomultiplier for counting recoil protons which are generated in the scintillator by the neutrons.

6. A device in accordance with claim 2, wherein said electronic clock is constituted by:
   a current generator connected to said generator for producing the control voltage,
   a capacitor connected to said current generator,
   and a unijunction transistor connected to the terminals of said capacitor and causing the discharge of said capacitor when the terminal voltage thereof attains the turn-on voltage of said transistor.

7. A device in accordance with claim 2, and further comprising a circuit for preventing the duration of said pulses from being shorter than the time which is necessary to ensure total ionization of the particle source.

8. A device in accordance with claim 2, wherein said control voltage produced by said generator is modulated voltage.

9. A device in accordance with claim 2, wherein the control voltage produced by said generator is a continuous voltage.

* * * * *